United States Patent
Zhou et al.

(10) Patent No.: US 9,450,939 B2
(45) Date of Patent: Sep. 20, 2016

(54) METHOD AND APPARATUS FOR SERVICE LOGIN BASED ON THIRD PARTY'S INFORMATION

(71) Applicant: Tencent Technology (Shenzhen) Co., Ltd., Shenzhen, Guangdong (CN)

(72) Inventors: Hao Zhou, Guangdong (CN); Wenrui Zhang, Guangdong (CN); Hui Wang, Guangdong (CN); Tianqing Huang, Guangdong (CN); Wen Cha, Guangdong (CN); Lifang Cen, Guangdong (CN); Jinfu Deng, Guangdong (CN)

(73) Assignee: Tencent Technology (Shenzhen) Co., Ltd., Guangdong (CN)

( * ) Notice: Subject to any disclaimer, the term of this patent is extended or adjusted under 35 U.S.C. 154(b) by 11 days.

(21) Appl. No.: 14/487,621

(22) Filed: Sep. 16, 2014

(65) Prior Publication Data
US 2015/0096004 A1 Apr. 2, 2015

Related U.S. Application Data

(63) Continuation of application No. PCT/CN2014/079052, filed on Jun. 3, 2014.

(30) Foreign Application Priority Data

Sep. 29, 2013 (CN) .......................... 2013 1 4619073

(51) Int. Cl.
*G06F 7/04* (2006.01)
*G06F 15/16* (2006.01)
(Continued)

(52) U.S. Cl.
CPC ............. *H04L 63/08* (2013.01); *G06F 21/316* (2013.01); *H04L 63/1441* (2013.01);
(Continued)

(58) Field of Classification Search
CPC ..... H04L 63/08; H04L 63/10; H04L 63/105; H04L 63/107; H04L 63/108; G06F 21/31; G06F 21/316; G06F 21/32
USPC .......................................................... 726/7
See application file for complete search history.

(56) References Cited

U.S. PATENT DOCUMENTS 7,908,645 B2 * 3/2011 Varghese ............ G06Q 20/341
715/773
8,185,501 B1 * 5/2012 Cherukumudi ... G06F 17/30563
707/610

(Continued)

FOREIGN PATENT DOCUMENTS

CN 101388777 A 3/2009
CN 101582886 A 11/2009

(Continued)

OTHER PUBLICATIONS

International Search Report received in PCT Application No. PCT/CN2014/079052 dated Sep. 2, 2014.

*Primary Examiner* — Jayesh Jhaveri
(74) *Attorney, Agent, or Firm* — Brinks Gilson & Lione

(57) ABSTRACT

A method and apparatus for service login to a service provider sites have been disclosed. The method including: receiving a login request from a user, wherein the login request comprises at least both terminal's login information input by the user and third party account information pertaining to the user; after successful verification on the third party account information, determining by the service provider, whether the terminal's login information input by the user matches to reference login information, wherein the reference login information comprises specific information of the user to further identify user's identity; if the terminal's login information matches to at least a portion of the reference login information, delivering service to the terminal according to the third party account information.

20 Claims, 5 Drawing Sheets

(51) Int. Cl.
   *G06F 17/30* (2006.01)
   *H04L 29/06* (2006.01)
   *G06F 21/32* (2013.01)
   *G06F 21/31* (2013.01)

(52) U.S. Cl.
   CPC ............ *G06F 21/31* (2013.01); *G06F 21/32* (2013.01); *H04L 63/0876* (2013.01); *H04L 63/10* (2013.01); *H04L 63/105* (2013.01); *H04L 63/107* (2013.01); *H04L 63/108* (2013.01)

(56) References Cited

U.S. PATENT DOCUMENTS

| | | | | |
|---|---|---|---|---|
| 9,032,498 | B1* | 5/2015 | Ben Ayed | G06F 21/35 726/9 |
| 2003/0055966 | A1* | 3/2003 | Tomida | H04L 63/0227 709/225 |
| 2004/0083394 | A1* | 4/2004 | Brebner | G06F 21/31 726/19 |
| 2007/0143851 | A1* | 6/2007 | Nicodemus | G06F 21/55 726/25 |
| 2009/0328186 | A1* | 12/2009 | Pollutro | G06F 21/31 726/13 |
| 2010/0174900 | A1* | 7/2010 | Lin | G06Q 20/12 713/155 |
| 2012/0060207 | A1* | 3/2012 | Mardikar | G06F 21/33 726/4 |
| 2013/0018859 | A1* | 1/2013 | Wilkins | G06Q 10/10 707/696 |
| 2014/0068723 | A1* | 3/2014 | Grim | H04W 12/06 726/4 |
| 2014/0096215 | A1* | 4/2014 | Hessler | H04L 63/0869 726/7 |
| 2014/0136704 | A1* | 5/2014 | Yang | H04L 9/32 709/225 |
| 2014/0189808 | A1* | 7/2014 | Mahaffey | H04L 63/0853 726/4 |
| 2014/0310778 | A1* | 10/2014 | Zhang | H04L 63/102 726/4 |

FOREIGN PATENT DOCUMENTS

| | | |
|---|---|---|
| CN | 102916933 A | 2/2013 |
| CN | 103269270 A | 8/2013 |
| EP | 2 611 106 A | 7/2013 |

* cited by examiner

METHOD AND APPARATUS FOR SERVICE LOGIN BASED ON THIRD PARTY'S INFORMATION

CROSS-REFERENCE TO RELATED APPLICATIONS

The application is a continuation of PCT Application No. PCT/CN2014/079052, filed on Jun. 3, 2014, which claims priority to Chinese Patent Application No. 2013104619073, filed on Sep. 29, 2013, which are incorporated by reference in their entireties.

FIELD OF THE TECHNOLOGY

The invention belongs to the field of network security technology; in particular, to a method and apparatus for service login based on third party's information.

BACKGROUND

The emergence of third party's account open platforms enable expanded services and applications to a much bigger user population with much simplified login mechanisms and convenience. More specifically, third party's account open platforms remove a requirement that each individual user must first establish an account before logging in to subscribe a service or application belonging to a service provider or merchant. Instead, any user may login to use services from other service providers or merchants, by simply sharing and authorizing in advance, the user's own account login information through a mechanism called third party's account open platform authorizations.

Such convenience and login mechanisms, however, have also become a target for cyber hacking to steal a high volume of users account information, which a successful hacking effort to steal a user's account information of one service provider or merchant may lead to a chain of collateral damages to the same user in other service providers which have been authorized to login through the third party's account open platform mechanism.

One conventional login mechanism in accessing a certain service provider utilizing third party's account open platform is through an embedded login service, which a user may jump to login at a third party's account page. Once the login is successful, the third party's account open platform may enquire the user to authorize the current service. Once user's authorization is obtained, the third party account open platform may synchronize the information corresponding to the granted authority to the current service provider, and the current service provider is simultaneously associated and logged in to the user's account on the third party account open platform.

When logging in to a certain service provider, a third party account open platform may assure a login security merely by means of account verification, and once the third party account is stolen by a cyber-hackler, other service providers associated with the stolen account may also be attacked along with it. The account security offered by the third party account open platform may therefore be insufficient in protecting users.

SUMMARY

An embodiment of the present disclosure has provided a method for service login to a service provider, including: receiving a login request from a user, wherein the login request comprises at least both terminal's login information input by the user and third party account information pertaining to the user; after successful verification on the third party account information, determining by the service provider, whether the terminal's login information input by the user matches to reference login information, wherein the reference login information comprises specific information of the user to further identify user's identity; and if the terminal's login information matches to at least a portion of the reference login information, delivering service to the terminal according to the third party account information.

Another embodiment of the disclosure discloses an apparatus for service login, which includes: a login request reception module which receives a login request from a user, wherein the login request comprises at least both terminal's login information input by the user and third party account information pertaining to the user; a judgment module which after successful verification on the third party account information, judges whether the terminal's login information input by the user matches to reference login information, wherein the reference login information comprises specific information of the user to further identify user's identity; a service delivery module which if the terminal's login information matches to at least a portion of the reference login information, delivers service to the terminal according to the third party account information.

The beneficial effects of the technical scheme provided by the present disclosure are as follows: the present disclosure enhances terminal login pending information verification security by judging whether the pending terminal login information matches the reference login information to verify the login information when verification of third party account information is successful. In effect, this is to determine the pending login is consistent with the user's previous login habits (e.g. whether the same terminal equipment is being used for the pending login, etc), and delivering service to the terminal according to the third party account information when the pending login information matches the reference login information, so that a server (e.g., service provider's server) may further verify the login information in case if the third party account has been stolen, thereby enhancing the security of relying on utilizing third party account for service login.

BRIEF DESCRIPTION OF THE DRAWINGS

The accompanying drawings are included to provide a further understanding of the claims and disclosure, are incorporated in, and constitute a part of this specification. The detailed description and illustrated embodiments described serve to explain the principles defined by the claims.

DETAILED DESCRIPTION OF THE EMBODIMENTS

Figure 1:
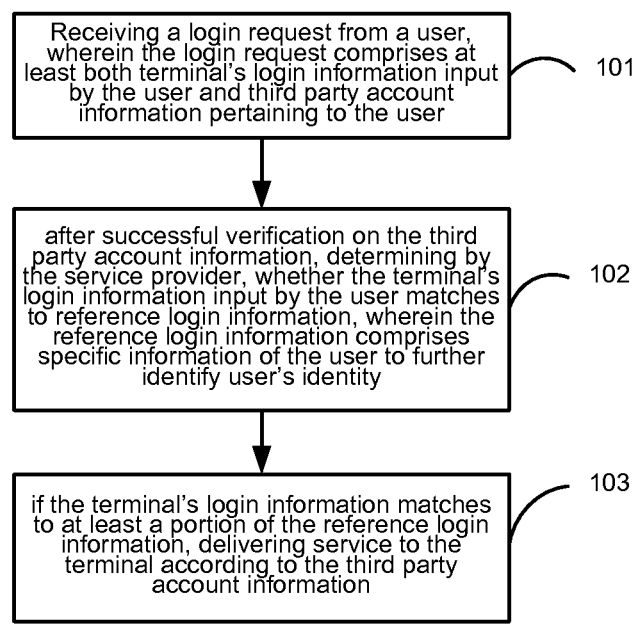
FIG. 1 is an exemplary flowchart illustrating a method for service login provided by a service provider, according to an embodiment of the disclosure.

The various embodiments of the present disclosure are further described in details in combination with attached drawings and embodiments below. It should be understood that the specific embodiments described here are used only to explain the present disclosure, and are not used to limit the present disclosure. In addition, for the sake of keeping description brief and concise, the newly added features, or features that are different from those previously described in each new embodiment will be described in details. Similar features may be referenced back to the prior descriptions in a prior numbered drawing or referenced ahead to a higher numbered drawing.

In order to clarify the object, technical scheme and advantages of the present disclosure more specifically, the present disclosure is illustrated in further details with the accompanied drawings and embodiments. It should be understood that the embodiments described herein are merely examples to illustrate the present disclosure, not to limit the present disclosure.

Some key terms related to the present disclosures may be defined as follows:

"Third party account server": is a server provided with user's account mechanism and is configured to manage third party account information. The third party account server and the service provider's server of the present disclosure may be under anyone of the following situations: (1) the third party account server and the service provider's server each belongs to different account mechanisms; (2) the third party account server and the service provider's server each provides services for different applications; (3) the third party account server and the service provider's server each belongs to different operators.

"Third party (user's) account information" (or simply referred to as "User ID"): refers to an identifier on a third party account server belonging to an operator different from that of the current service provider's server, and uniquely identifying a user's identity, the user's identity being obtainable from the third party account server by the user through user's registration.

"Open account information" (also referred to as "Open ID"): is an identifier generated according to an application identifier (App ID) and the third party account information (User ID). Open account information replaces the user identifier (User ID) on a terminal, so that the third party account server does not directly provide the user identifier to the terminal. In other words, user identity is identified by Open ID on a terminal.

Below are exemplary explanations in each of the following terms:

Terminal's login information: such as Device ID, MAC address, IP, Device Location, Login Time.

Third party account information: such as Access token, Open ID, Personalized Data (e.g. nickname, headshot, email address)

Reference login information: basically include at least the Terminal's login history information or statistics. The reference login information is first collected starting when a user first logged in at a terminal (i.e., device). The Device ID and Login Time may be recorded by the service provider's server to be built up as part of the reference login information. When the user changes to another device to log in, or the login takes place at a time different from an unusual time in the record, the login may be considered as a potential hacking or a potential attack to the service provider server.

With the above understanding in mind, the various embodiments of the disclosure may be described as follows.

FIG. 1 is an exemplary flowchart illustrating a method for service login provided by a service provider, according to an embodiment of the disclosure. Referring to FIG. 1, the method may include the following exemplary steps:

Step 101: receiving a login request from a user, wherein the login request comprises at least both terminal's login information input by the user and third party account information pertaining to the user;

Step 102: after successful verification on the third party account information, determining by the service provider, whether the terminal's login information input by the user matches to reference login information, wherein the reference login information comprises specific information of the user to further identify user's identity;

Step 103: if the terminal's login information matches to at least a portion of the reference login information, delivering service to the terminal according to the third party account information.

The present disclosure enhances terminal login pending information verification security by judging whether the pending terminal login information matches the reference login information to verify the login information when verification of third party account information is successful. In effect, this is to determine the pending login is consistent with the user's previous login habits (e.g. whether the same terminal equipment is being used for the pending login, etc), and delivering service to the terminal according to the third party account information when the pending login information matches the reference login information, so that the service provider's server may further verify the login information in case if the third party account has been stolen, thereby enhancing the security of relying on utilizing third party account for service login.

In an embodiment, the step of "determining by the service provider, whether the terminal's login information input by the user matches to reference login information" may further include: acquiring by the terminal, the reference login information which corresponds to the third party account information, wherein: when the terminal's login information matches to at least a portion of the reference login information, confirming by the service provider that the login request is successful; otherwise, confirming by the service provider that the login request is unsuccessful.

In another embodiment, the terminal's login information may include user's login time, and the step of "determining by the service provider, whether the terminal's login information input by the user matches to reference login information" may further include: acquiring a designated user's login time period corresponding to the third party account information, wherein a user's login statistical value of the third party account information within the acquired user's designated login time period being greater than a first preset threshold, wherein: when the user's login time is within the user's designated login time period, confirming that the user's login information matches the reference login information; otherwise, confirming that the login information does not match the reference login information.

In another embodiment, the terminal's login information comprises an application identification code, and the step of "determining by the service provider, whether the terminal's login information input by the user matches to reference login information" may further include: acquiring third party account information corresponding to the application identification code; when the third party account information from the log in request being the same as the third party account information corresponding to the application identification code, confirming that the terminal's login information matches the reference login information; otherwise, confirming that the terminal's login information does not match the reference login information code.

In another embodiment, the method may further include: if the terminal's login information does not match the reference login information, verifying the terminal according to a preset verification mode associated with the third party account information; when the verification is successful, delivering the service to the terminal according to the third party account information.

In another embodiment, the step of "verifying of the terminal according to the preset verification mode associated with the third party account information" may further include: sending a designated verification code to a mobile phone number associated with the third party account information when short message verification is the preset verification mode, wherein the designated verification code is to be entered as an additional input to the terminal; confirming that the verification of the terminal is successful when the designated verification code received from the terminal as the additional input is the same as the sent designated verification code corresponding to the third party account information, otherwise, the verification of the terminal is not successful.

Yet in another embodiment, the step of "verifying of the terminal according to the preset verification mode associated with the third party account information" may further include: sending a verification link to an electronic mailbox (e-mail) associated with the third party account information when e-mail verification is the preset verification mode, wherein the verification link is to be visited on the terminal; confirming that verification of the terminal is successful when a network address corresponding to the verification link has been visited on the terminal within an interval of a first preset duration, otherwise, the verification of the terminal is not successful.

Yet in another embodiment, the step of "verifying of the terminal according to the preset verification mode associated with the third party account information" may further include: sending a designated verification code to an instant messaging application account associated with the third party account information when instant messaging application verification is the preset verification mode, wherein the designated verification code is to be entered as an additional input to the terminal; confirming that verification of the terminal is successful when the designated verification code received from the terminal as the additional input is the same as the sent designated verification code corresponding to the third party account information, otherwise, the verification of the terminal is not successful.

Yet in another embodiment, the step of "verifying of the terminal according to the preset verification mode associated with the third party account information" may further include: providing a backup data verification prompt associated with the third party account information when backup data verification is the preset verification mode, wherein the prompted backup data is to be entered as an additional input to the terminal; confirming that verification of the terminal is successful when the backup data received from the terminal as the additional input matches the prompted backup data corresponding to the third party account information, otherwise, the verification of the terminal is not successful.

In an embodiment, the backup data verification may include one or more of: biometric verification and text information verification, and the step of "providing of the backup data verification prompt associated with the third party account information when backup data verification is the preset verification mode" may further include: providing a biometric data input prompt associated with the third party account information when biometric data verification is the preset verification mode, wherein the biometric data is to be entered as an additional input to the terminal; and confirming that the backup data associated with the third party account information verification of the terminal is successful when the biometric data received from the terminal as the additional input matches the biometric data corresponding to the third party account information, otherwise, the verification of the terminal is not successful; or providing a text information input prompt associated with the third party account information when text information verification is the preset verification mode, wherein the text information is to be entered as an additional input to the terminal; and confirming that the backup data associated with the third party account information verification of the terminal is successful when the received text information matches the backup data associated with the third party account information, otherwise, the verification of the terminal is not successful.

In an embodiment, the biometric data verification comprises one or more of: fingerprint information verification, voice verification, semantic verification, iris verification, heartbeat verification and facial features verification.

In an embodiment, the text information verification comprises one or more of: password card verification, digital certificate verification, signature information verification, preset question verification and preset trajectory verification.

Yet in another embodiment, after performing the verification according to the third party account information, the method may further include: omitting further login request after a number of consecutively received login requests have failed verifications and the number has exceeded a third preset threshold.

Yet in another embodiment, the terminal's login information comprises application identification code, and the method may further include: omitting a designated login request if a number of times the designated login request has received within a second preset duration has exceeded a fourth preset threshold, wherein the designated login request carries the application identification code, and wherein the third party account information carried by each designated login request being different.

Alternatively, the reference login information may include one or more of: terminal identifier, terminal equipment serial number, application identification code, terminal IP address, terminal geographical position information and terminal login time.

Yet in another embodiment, the method may further include: determining whether an open account information corresponding to the third party account information has already been saved on a server according to the third party account information when a login request is received; the verification of the third party account information is successful when it is determined that the open account information corresponding to the third party account information has already been saved on the service provider's server.

All the foregoing technical schemes may be combined in any manner to form optional new embodiments of the present disclosure.

Figure 2:
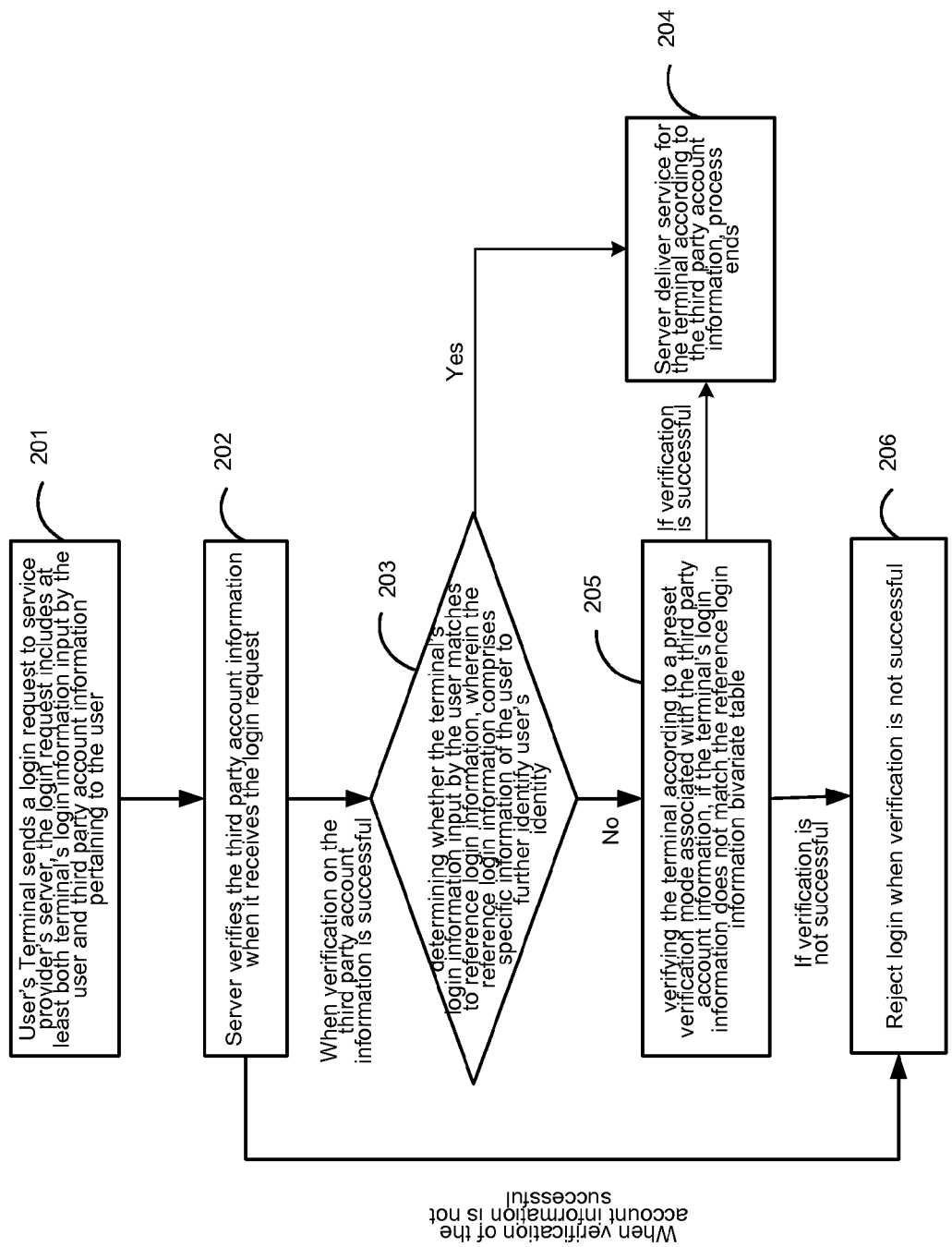
FIG. 2 is an exemplary process flow diagram of a method for service login provided by a service provider, according to another embodiment of the disclosure.

FIG. 2 is an exemplary process flow diagram of a method for service login provided by a service provider, according to another embodiment of the disclosure. Referring to FIG. 2, the method may include the following exemplary steps:

Step 201: user's terminal sends a login request to a service provider's server. The login request may include at least both terminal's login information input by the user and third party account information (received from a third party account server) pertaining to the user.

As far as the service provider's server and the third party account server are concerned, the service provider's server when being used for the first time in the login request, the service provider's server may be authorized when the verification of the third party account information by the third party account server is successful. The service provider's server may acquire open account information corresponding to the third party account information and a current logged in application identifier at the user's terminal. During a subsequent use, the current logged in third party account information may be verified according to a correspondence between the third party account information and the open account information. It is beyond the scope of the disclosure in defining how the third party account information and the open account information are associated and how the third party account information is authenticated.

In the present disclosure, the terminal's login information may include but is not limited to one or more of terminal identifier, terminal equipment serial number, application identification code, terminal IP (Internet Protocol) address, terminal geographical position information and terminal login time. A terminal identifier may be a GUID (Globally Unique Identifier) of terminal equipment or other information used to uniquely identifying the terminal; and a terminal equipment serial number may be an IMEI (International Mobile Equipment Identification Number) of a mobile terminal equipment (i.e., user's terminal) or other information used to uniquely identifying the terminal. An application identification code may be a code generated by the service provider's server on the terminal and uniquely identifying the user's terminal, such as an identification code generated according to application program identifier, startup time, etc, and the code may include random number code. A terminal IP address is an IP address used by a user's terminal for internet communication. Terminal geographical position information may be the terminal's access point information, terminal base station ID (identifier), GPS (Global Positioning System) positioning information and information used for determining the current geographical position of the terminal. Terminal login time is the time at which a login request is sent by the terminal to the service provider's server.

Figure 3:
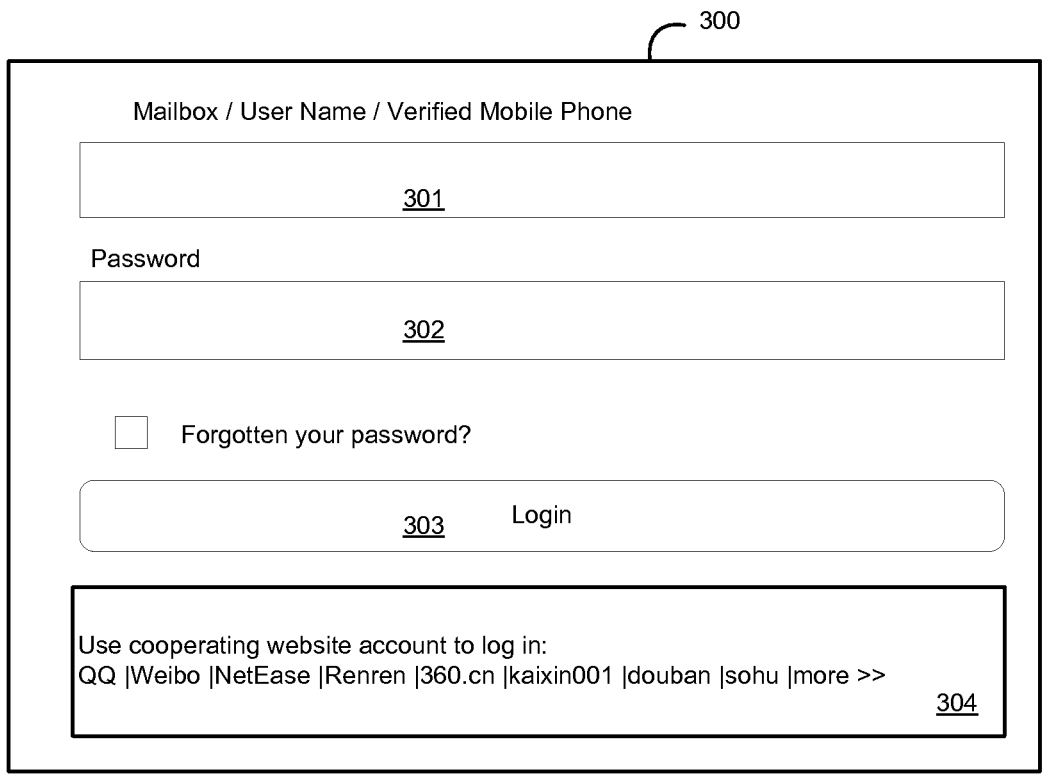
FIG. 3 is an exemplary login page, according to an embodiment of the disclosure.

In the present disclosure, the service provider's server may provide a login page information for the terminal, and the terminal may display a login page (300) (such as the one shown in FIG. 3) of the service according to the login page information. The service login page (300) may include an account information entry box (301), a password entry box (302), login options (303), third party account login option list (304), etc, The third party account login option list (304) may include a plurality of third party account login options of other account mechanisms, e.g. QQ, Weibo, NetEase, Renren, 360.cn, kaixin001, douban, sohu, Facebook, Skype, Google chat and many other options as shown in FIG. 3.

When the user's terminal detects selected operation of an item in the third party account login option list (304), the user's terminal may send a login request that may carry third party account information to the service provider's server. When the service provider's server receives a login request sent from the user's terminal, the service provider's server may lead the user's terminal interface to jump to the login interface of the option corresponding to the selected operation. When the user inputs account information on the interface and triggers a login operation after the jump, the user's terminal may send a login request to the service provider's server, e.g. the user's terminal may detect selected operation of the Weibo option, the user's terminal may jump to a login interface of a Weibo account.

Step 202: The service provider's server verifies the third party account information when it receives the login request; wherein if verification of the account information is successful, perform Step 203, otherwise, perform step 206.

In practice, step 202 may include: determining whether an open account information corresponding to the third party account information has already been saved on a server according to the third party account information when a login request is received; and the verification of the third party account information is successful when it is determined that the open account information corresponding to the third party account information has already been saved on the service provider's server.

To enhance account security, the method may further include the following step after Step 202: omitting further login request after a number of consecutively received login requests have failed verifications and the number has exceeded a third preset threshold, or simply omit the login request when the login request is received again if the number of verification failures exceeds a third preset threshold.

When the service provider's server has received a login request for a number of times and discovered after verification of the third party account information carried by the login request, that the number of times verification of the third party account information is unsuccessful has exceeded a certain value, then the login based on the third party account information may be deemed as an intent that someone tries to hack into an account through stealing the third party account information using multiple login request attempts. Hence the login request attempts may be omitted when it is received again after exceeding a third preset threshold. Wherein, the third preset threshold may be set by technical personnel during development, or may be set or adjusted by the user during use. It will be beyond the scope of the present disclosure to specifically define the third preset threshold.

It must be noted that under the aforementioned situation (i.e., encountering an account hacker) where the number of times verification being unsuccessful has exceeded the third preset threshold, login request received by the service provider's server may be from the same terminal or different terminals. The account hackers may use different terminals to make separate attempts, for the purpose of security enhancement, no judgment or detection is made in a situation where verification is not successful as to whether the terminals sending the login requests are the same.

To prevent account stealers from using stolen third party account to login the service, after verification of the third party account information is successful, the pending login information may be further verified so as to ensure security of the login, as described in detail in Step 203.

Step 203: determining whether the terminal's login information matches the reference login information when verification of the third party account information is successful. If yes, perform Step 204, otherwise, perform Step 206.

Preferably, a login statistical value corresponding to the terminal's login information in the reference login information being greater than a second preset threshold.

When verifying login information, judgment may further be made as to whether the terminal sending the login request is the "frequently used terminal" when the third party account information is logged in. The "frequently used terminal" may mean that the third party account information has been logged in on the same terminal for a number of times or has been frequently used to log in within a certain time range or time interval. Therefore, terminal's login information whose login statistical value is greater than a second preset threshold may be taken as reference login information, i.e. the reference login information is the most frequently used terminal's login information saved on the service provider's server. Wherein, the specific value of the second preset threshold may be set by technical personnel during development, or may be set or adjusted by the user during use. It will be beyond the scope of the present disclosure to specifically define the second preset threshold.

The reference login information may be historical login data corresponding to the third party account information, e.g. terminal identifier, terminal geographical position information, etc. The reference login information may be determined from the terminal's login information; or the reference login information may refer to historical login data of the service corresponding to the terminal information, e.g. chat history, number of times of login history, etc.

Step 203 may include: the service provider's server acquiring reference login information corresponding to the third party account information, when verification of the third party account information is successful; determining by the service provider, whether the terminal's login information input by the user matches to reference login information. If the terminal's login information matches to at least a portion of the reference login information, delivering service to the terminal according to the third party account information, otherwise, confirming that the terminal's login information does not match any of the reference login information.

The terminal's login information includes but is not limited to: one or more of terminal identifier, terminal equipment serial number, application identification code, terminal IP address, terminal geographical position information and terminal login time. Correspondingly, the service provider's server may maintain a correspondence between the third party account information and the reference login information, e.g. multiple correspondences between the third party account information and terminal identifier, between the third party account information and terminal equipment serial number, between the third party account information and application identification code, between the third party account information and terminal IP address, between the third party account information and terminal geographical position information, and between the third party account information and terminal's login time.

When the terminal's login information is any of: terminal identifier, terminal equipment serial number, application identification code, terminal IP address and terminal geographical position information; the service provider's server may acquire reference login information of the third party account information according to the third party account information. If the terminal's login information is the same as any of the reference login information, it is deemed that the terminal sending the current terminal's login request is the same terminal as the terminal used for a login prior to the third party account information. In addition, it may be determined that the login information may match the reference login information. If the login information is not the same as any of the reference login information, it may be deemed that the terminal sending the current login request may not be the same terminal as the terminal used for login prior to the third party account information, and it may be determined that the login has security risks and may need to be further verified.

For example, if the login information is a terminal equipment serial number and when the verification of the third party account information is successful, the service provider's server may acquire the reference login information corresponding to the third party account information as 426, 123 and 451, respectively. If the login information in the login request is 123, then it may be known by comparison that the terminal's login information that is identical to the terminal's login information may exist in the reference login information, and it may be determined that the login information matches the reference login information. If the terminal's login information in the login request received by the service provider's server is 987, then it may be known by comparison that no login information identical to the terminal's login information may exists in the reference login information, and it is therefore determined that the terminal's login information does not match the reference login information.

Wherein, a terminal's login statistical value may be a number of times a terminal login using the third party account information, the accumulated login duration, the login frequency and other magnitudes reflecting the intensity of use of the third party account information.

For example, if terminal's login information is the terminal's geographical position information, the statistical value is the number of login times using the third party account information at a certain terminal geographical position in a week, and the second preset threshold may be 10 times. When verification of the third party account information is successful, the service provider's server may acquire the reference login information corresponding to the third party account information, such as Beijing and Tianjin.

If the terminal's login information in the login request is in Shanghai, it may then be known through comparison that no login information identical to the terminal's login information may exist in the reference login information, and it may be determined that the login information does not match the reference login information. If the login information in the login request is in Beijing, then it may be known through comparison that the user's or the terminal's login information that is identical to the login information may exist in the reference login information and the number of login times using the third party account information in Beijing may be greater than 10 times. It may then be determined that the terminal's login information may match the reference login information.

In another embodiment of the present disclosure, if the login information is terminal's login time, Step 203 may instead be replaced with the following steps: the service provider's server may acquire a designated user's login time period corresponding to the third party account information, wherein a user's login statistical value of the third party account information within the acquired user's designated login time period being greater than a first preset threshold, wherein: when the user's login time is within the user's designated login time period, confirming that the user's login information matches the reference login information; otherwise, confirming that the login information does not match the reference login information.

When the terminal's login information matches the reference login information, it may be deemed that the login request is consistent with the user's login habit and therefore it may be considered that the pending login request may be sent by the same user who has previously logged in. When the login information does not match the reference login information, it may be deemed that the pending login request may be is made by a different user. In this regard, user's login habit may be used for further account security protection.

The designated login time period is a time period during which login requests by the same user with the third party account information are relatively frequently made in a day. Login statistics may be obtained by the service provider's server according to the login times during a day which the third party account information may be accessed by a user for login daily. The time period during which logins are relatively frequently made may be a time period during which the login statistical value is greater than a first preset threshold.

For example, the designated login time period may be a consecutive time period, or several inconsecutive time periods. For example, the designated time period may be 12:00~14:00, or the designated time period may be a combination of 12:00~13:00 and 17:20~19:45. Wherein, the login statistical value in the designated login time period may be the number of login times using the third party account information. The accumulated login duration, the login frequency and other magnitudes reflecting the intensity of use of the third party account information; the first preset threshold may be set by technical personnel during development, or may be set or adjusted by the user during use. It will be beyond the scope of the present disclosure to specifically define the first preset threshold.

In another example, during the login process the service provider's server may acquire a designated login time periods as 12:00~14:00 and 17:20~19:30, respectively. If the terminal login time corresponding to the third party account information for the login is 13:23, then service provider's the service provider's server may be made aware through comparison that the terminal login time 13:23 is within the designated time period 12:00~14:00 and it may be determined that the login information may match the reference login information.

if the terminal login time corresponding to the third party account information for the login is 15:23, then the service provider's server may be made aware through comparison that the terminal login time 15:23 is not within any of the designated time periods 12:00~14:00 and 17:20~19:30, and it may be determined that the login information does not match the reference login information.

In another embodiment of the present disclosure, if the terminal's login information may include application identification code, step 203 may be replaced instead with the following steps: the service provider's server acquires third party account information corresponding to the application identification code; and when the third party account information from the log in request being the same as the third party account information corresponding to the application identification code, confirming that the terminal's login information matches the reference login information; otherwise, confirming that the terminal's login information does not match the reference login information code.

Specifically, as the identification code uniquely identifies the terminal where it is located, the service provider's server may acquire the third party account information corresponding to the application identification code, i.e. the terminal identified by the application identification code which is being used for the third party account information login. If the third party account information corresponding to the application identification code includes the third party account information, i.e. the terminal identified by the application identification code has used the third party account information for login, it may be confirmed that the login information matches the reference login information; otherwise, the terminal's login information does not match the if the third party account information corresponding to the application identification code does not comprise the third party account information, i.e. the terminal identified by the application identification code has not used the third party account information for login, it is determined that the login information does not match the reference login information.

Normally, a user may use the same terminal to login to a certain service provider (or service) and the service provider (or service) will record the usage data about logins using certain third party account information, e.g. chat records, speech records, etc, These third party account information and usage data may be associated with the application identification code of the user's terminal. Therefore, whether any usage data about logins using the third party account information may be saved on the terminal, may be determined through the application identification code of the terminal. In other words, which accounts have been logged in may be determined through the application identification code, and whether the third party account information is logged in at the terminal for the first time may be judged according to the third party account information having been logged in, and the third party account information currently requesting for a login.

Furthermore, account hackers or stealers may have numerous modes of attacks. There may be situation where different third party account information is continuously used for login at the same terminal. Therefore, if the number of times for which a designated login request is received in the second preset duration is greater than the fourth preset threshold, the service provider's server omits the designated login request, the designated login request carrying the application identification code, each designated login request carrying different third party account information.

If the service provider's server has received a plurality of designated login requests sent from the same terminal in the second preset duration and the third party account information carried by the plurality of designated login requests even though the plurality of designated login requests carry the same application identification code, it may be deemed that attempts have been made to use different third party account information within a short time range for login at the same terminal. For security sake, the service provider's server may omit the designated login requests. Wherein, the fourth preset threshold may be set by technical personnel during development, or may be set or adjusted by the user during use. It will be beyond the scope of the present disclosure to specifically define the fourth preset threshold.

In another example, during the login process the fourth preset threshold may be 4. When the service provider's server receives a login request, the third party account information corresponding to the application identification code acquired by the service provider's server based on the application identification code carried by the login request may include User1, User2, User3 and User4, i.e. the third party account information used for login at the terminal which identifies the application identification code may include User1, User2, User3 and User4, respectively. If the third party account information used for the login this time is User5, the service provider's server may be made aware through comparison, that the terminal sending the login request has been used for login to 5 accounts. Therefore, it is deemed that attempts are being made to login to different third party account information at the same terminal within a short time range, and the login request is therefore omitted for security protection.

It may be noted that Step 203 described above may use only verification of login information as an example. In another embodiment of the present disclosure, verification of any combination of at least two of terminal identifier, terminal equipment serial number, application identification code, terminal IP address, terminal geographical position information and terminal login time may be carried out. When verifying multiple items of the login information, the service provider's server may separately perform verification of each item of the login information according to the method of Step 203, if verification of each item of the login information is successful, it may be determined that the verification of the login information is successful. If verification of any item of the login information is not successful, it may be determined that the verification of the login information is not successful.

For example, the reference login information corresponding to the third party account information is a combination of terminal login time and terminal geographical position information, when verification of the third party account information is successful, the service provider's server acquires the designated login time periods from the reference login information corresponding to the third party account information as 12:00~14:00 and 17:20~19:30, and acquires the terminal geographical position information therefrom as Beijing and Tianjin; if the terminal login time in the login information in the login request received by the service provider's server is 13:23 and the terminal geographical position is Shanghai, it can be known through comparison that the terminal login time 13:23 is within the designated login time period 12:00~14:00 but there exists no terminal geographical position identical to the terminal geographical position in the login information among the terminal geographical positions in the reference login information, and it is determined that the login information does not match the reference login information.

Step 203 is a process for verification of login information using the third party account information. Through Step 203, the service provider's server verifies login information of the login this time so as to verity whether the scenario of the login this time is consistent with the user's habit, e.g. verifying whether the current terminal is a frequently used terminal for login using the third party account information, or verifying whether the terminal login time of the login this time is within the time period during which the third party information is frequently used for login, or verifying whether the third party account information is used for login at the terminal for the first time, for further verification of the security of login. When verification is not successful, it indicates changes in login scenario, and when it is determined that the login scenario changes have taken place, the login is deemed risky and the process proceeds to Step 205 to perform verification of the login by other means.

It must be noted that Step 203 is described above using only as an example where the correspondence saved on the service provider's server is the correspondence between the third party account information and the reference login information, and that in reality the correspondence saved on the service provider's server may be the correspondence between open account information and the reference login information, hence based on the correspondence between the third party account information and the open account information, corresponding open account information may also be indirectly acquired according to the third party account information, and the reference login information corresponding to the open account information (i.e. the reference login information corresponding to the third party account information) may in turn be acquired according to the acquired open account information and the saved correspondence, for which the manner is not specifically defined in this embodiment of the present disclosure.

Step 204: the service provider's server delivers service to the terminal according to the third party account information, and the process ends. If the service provider's server determines that the login information matches the reference login information, then it is deemed that the terminal currently using the third party account information for login may be a terminal which the user utilizes the third party account information for login, and the service provider's server may provide service for the terminal according to the third party account information.

Step 205: if the terminal's login information does not match the reference login information, verifying the terminal according to a preset verification mode associated with the third party account information. If the verification is successful, perform Step 204. If the verification is not successful, perform Step 206.

If the login information does not match the reference login information, it is deemed that the login has security risks, and the preset verification mode associated with the third party account information is used to verify the terminal so that multi-layer security protection is provided for the login. Wherein, the preset verification mode may be one of: a short message, an e-mail, a password card and instant messaging application.

If the login information does not match the reference login information, the method for verification of the terminal is different depending on the difference of the preset verification mode associated with the third party account information. Depending on the difference of the preset verification mode associated with the third party account information, verification of the terminal includes but is not limited to the following methods:

(1) sending a designated verification code to a mobile phone number associated with the third party account information when short message verification is the preset verification mode, wherein the designated verification code is to be entered as an additional input to the terminal; confirming that the verification of the terminal is successful when the designated verification code received from the terminal as the additional input is the same as the sent designated verification code corresponding to the third party account information, otherwise, the verification of the terminal is not successful.

Specifically, if the login information does not match the reference login information, the service provider's server may generate a designated verification code and send a short message (SM) containing the designated verification code to the user's mobile phone number associated with the third party account information. At which time the terminal may display a short message verification page, the short message verification page may include a designated area for inputting the designated verification code, so that the user may input the designated verification code to the designated area when receiving the short message.

The service provider's server may receive the verification code inputted by the user, compare to see whether the verification code received is the same as the designated verification code sent to the user's mobile phone. If the verification code received is the same as the designated verification code, it is confirmed that verification of the terminal is successful; otherwise, it is confirmed that verification of the terminal is not successful.

Further, when the service provider's server sends a short message containing the designated verification code to the mobile phone number associated with the third party account information, a preset time interval has started and at which time the short message verification page may also include a resend verification code option, so that the user may select the resend verification code option to acquire a new designated verification code.

When the user has not received the short message after a preset time interval has been reached; when the clicking operation by the user with respect to the resend verification code option is detected, the service provider's server may regenerate a new designated verification code different from the designated verification code. At which time the service provider's server may only retain the new designated verification code and send a short message containing the new designated verification code to a mobile phone number associated with the third party account information, so that the user may be enabled to receive the re-sent new designated verification code, when the user has not received the designated verification code earlier sent, and to input the new designated verification when the short message is received. The service provider's server may compare the designated verification code received with the new designated verification code, and if the designated verification code received is the same as the new designated verification code, confirm that the verification of the terminal is successful, otherwise, confirm that the verification of the terminal is not successful.

If the service provider's server has not received the new designated verification code nor detected the clicking operation by the user with respect to the resend verification code option after a preset time interval has been reached, then the service provider's server remains at the short message verification page and awaits the user to click the resend verification code option or to close the current page to cancel the login. The preset time interval may be set by technical personnel during development, or may be set or adjusted by the user during use, and the preset time interval is not specifically defined in this embodiment of the present disclosure.

To illustrate the above embodiment, a preset time interval may currently be set as 10 seconds, and the mobile phone number associated with the third party account information may be illustrated as 12345678999. If the terminal's login information does not match the reference login information, the service provider's server may generate a designated verification code of A5V1, and may send a short message containing the designated verification code A5V1 to the mobile phone number 12345678999. If the service provider's server receives the verification code inputted to the login terminal by the user as A5V1 within 10 seconds, it may then be determined that the verification code received being the same as the designated verification code, and consequently, verification of the terminal is successful. If the user does not input the designated verification code in the designated area and clicks the resend verification code option from the login terminal within 10 seconds, the service provider's server may regenerate a new designated verification code B325 and sends a short message containing the designated verification code B325 to the mobile phone number 12345678999. Thereafter, if the service provider's server receives the verification code inputted by the user through the login terminal as A5V1, the verification may not be confirmed as successful.

It may be noted that the short message containing the designated verification code sent to the mobile phone number associated with the third party account information also includes information prompting the owner of the mobile phone number on the information about the verification code being used for login to the service using the third party account. Of course, short message carrying a verification link may also be sent to enable the user to perform further verification.

(2) Send a verification link to the electronic mailbox associated with the third party account information when the preset verification mode associated with the third party account information is e-mail verification, determine that verification of the terminal is successful when the network address corresponding to the verification link is visited, and determine that verification of the terminal is not successful when the network address corresponding to the verification link is not visited after an interval of a first preset duration. a first preset duration may be set by technical personnel during development, or may be set or adjusted by the user during use, and the first preset duration is not specifically defined in this embodiment of the present disclosure.

To illustrate the above embodiment, For example, the first preset duration may be set by the user as 12 hours, that is to say if the network address corresponding to the verification link is visited within 12 hours of the delivery of the verification link, the verification link may become an invalid link, in which case the user may not complete terminal verification by visiting the network address corresponding to the verification link.

Specifically, if the login information does not match the reference login information, the service provider's server may generate a verification link and send an e-mail containing the verification link to an electronic mailbox associated with the third party account information, so that the user may login to the electronic mailbox and visit the network address corresponding to the verification link by clicking the verification link in the e-mail. When the network address corresponding to the verification link is visited within the first preset duration, the service provider's server may determine that verification of the terminal is successful; if the network address corresponding to the verification link is not visited, the service provider's server may determine that verification of the terminal is not successful.

It must be noted that the starting point of the first preset duration may be the time at which the service provider's server sends a verification link to the electronic mailbox associated with the third party account information, and may also be the time at which the electronic mailbox receives the verification link, and the starting point is not specifically defined in this embodiment of the present disclosure.

For example, the first preset duration may be 12 hours and the electronic mailbox associated with the third party account information may be illustrated as 123@tencent.com. If the login information does not match the reference login information, the service provider's server may generates a verification link of: http://www.xxxx.com/123, and sends an e-mail containing the verification code to the electronic mailbox 123@tencent.com. If within 12 hours of the delivery of the verification link from the third party account, the user may log into the electronic mailbox 23@tencent.com to check the e-mail containing the verification link and click the verification link http://www.xxxx.com/123, i.e. the user may visit the network address corresponding to the verification link, then the service provider's server may determine that verification of the terminal is successful. If the user does not click the verification link http://www.xxxx.com/123 within 12 hours of the delivery of the verification link from the third party account, then the service provider's server may determine that verification of the terminal is not successful.

It must be noted that the e-mail containing the verification link sent to the electronic mailbox associated with the third party account information also includes information prompting the owner of the electronic mailbox on the information about the verification code being used for login to the service using the third party account.

(3) Send a designated verification code to the instant messaging application account associated with the third party account information when the preset verification mode associated with the third party account information is instant messaging application verification, determine that verification of the terminal is successful when the verification code received is the same as the designated verification code, otherwise, determine that verification of the terminal is not successful. The above method (3) is based on the same principles as those described in method (1).

(4) providing a backup data verification prompt associated with the third party account information when backup data verification is the preset verification mode, wherein the prompted backup data is to be entered as an additional input to the terminal; confirming that verification of the terminal is successful when the backup data received from the terminal as the additional input matches the prompted backup data corresponding to the third party account information, otherwise, the verification of the terminal is not successful.

More specifically, the backup data verification may include one or more of: biometric verification and text information verification, and the providing of the backup data verification prompt associated with the third party account information when backup data verification is the preset verification mode may include: providing a biometric data input prompt associated with the third party account information when biometric data verification is the preset verification mode, wherein the biometric data is to be entered as an additional input to the terminal; and confirming that the backup data associated with the third party account information verification of the terminal is successful when the biometric data received from the terminal as the additional input matches the biometric data corresponding to the third party account information, otherwise, the verification of the terminal is not successful; or providing a text information input prompt associated with the third party account information when text information verification is the preset verification mode, wherein the text information is to be entered as an additional input to the terminal; and confirming that the backup data associated with the third party account information verification of the terminal is successful when the received text information matches the backup data associated with the third party account information, otherwise, the verification of the terminal is not successful.

Wherein, the biometric data verification may include one or more of: fingerprint information verification, voice verification, semantic verification, iris verification, heartbeat verification and facial features verification.

Below are some exemplary biometric data verification embodiments:

(a) Providing fingerprint information input prompt: when the preset verification code associated with the third party account information is fingerprint information verification, determine that the verification information matches the backup data associated with the third party account information when the fingerprint information received is the same as the fingerprint information corresponding to the third party account information, determine that the verification information does not match the backup data associated with the third party account information when the fingerprint information received is not the same as the fingerprint information corresponding to the third party account information.

Specifically, the fingerprint information associated with the account prerecorded by the user may be saved on the service provider's server, and when the preset verification code associated with the third party account information is fingerprint information verification, the service provider's server prompts the user to input fingerprint information and provides a designated fingerprint information input area so that the user is enabled to input the fingerprint information saved on the terminal or the timely recorded fingerprint information in the designated input area according to the prompt. When the service provider's server determines that the degree of similarity between the verification information received and the fingerprint information associated with the account exceeds a fifth preset threshold, then the fingerprint information received is the same as the fingerprint information corresponding to the third party account information, and it is determined that the verification information matches the backup data associated with the third party account information. When the service provider's server determines that the degree of similarity between the verification information received and the fingerprint information associated with the account does not exceed the fifth preset threshold, then the fingerprint information received is not the same as the fingerprint information corresponding to the third party account information, and it is determined that the verification information does not match the backup data associated with the third party account information. Wherein, the fifth preset threshold may be adjusted according to the precision requirements of fingerprint information verification and is not specifically defined in this embodiment of the present disclosure.

For example, the fingerprint information associated with the third party account information saved on the service provider's server is fingerprint information 1 of the user User1 and the fifth preset threshold is 0.999, and if the verification information inputted by the user is fingerprint information 2, when the service provider's server determines that the degree of similarity between fingerprint information 2 and fingerprint information 1 is 0.9995 which is greater than 0.999, fingerprint information 1 is the same as fingerprint information 2 and it is determined that the verification information matches the backup data associated with the third party account information.

(b) Providing voice input prompt: when the preset verification code associated with the third party account information is voice verification, determine that the verification information matches the backup data associated with the third party account information when the voice information received is the same as the voice information corresponding to the third party account information, otherwise, determine that the verification information does not match the backup data associated with the third party account information.

The voice verification may be configured to identify whether the holder of the terminal currently requesting login matches the voice of the actual user of the account, and the voice verification may be implemented using voiceprint identification technology whereby a voice segment of the holder of the third party account information is prerecorded and the voiceprint characteristics (such as frequency, tone color) thereof are analyzed by the service provider's server for subsequent voice verification.

For example, the voiceprint waveform of the holder of the third party account information may be saved on the service provider's server, and when the service provider's server receives a voice sent from the terminal requesting login, the service provider's server may obtain a voiceprint waveform based on voice analysis and judges whether the voiceprint waveform obtained is the same as the voiceprint waveform saved thereon; and it they are the same, it is deemed that the terminal currently requesting login is really being used by a legitimate holder of the third party account information.

(c) Providing voice input prompt when the preset verification code associated with the third party account information is semantic verification: determine that the verification information matches the backup data associated with the third party account information when the semantic information of the voice information received is the same as the semantic information corresponding to the third party account information, determine that the verification information does not match the backup data associated with the third party account information when the semantic information of the voice information received is not the same as the semantic information corresponding to the third party account information.

The semantic verification is configured to identify whether the semantic element of the voice information collected at the terminal tallies with preset semantic element associated with the third party account information. For example, the prerecorded semantic information may be "Romance of the Three Kingdoms". If the semantic information obtained based on semantic identification of the voice information collected is "Romance of the Three Kingdoms", then it is deemed that the terminal currently requesting login is really being used by the legitimate holder of the third party account information.

(d) Providing an iris information input prompt when the preset verification code associated with the third party account information is iris verification, determine that the verification information matches the backup data associated with the third party account information when the iris information received is the same as the iris information corresponding to the third party account information, otherwise, determine that the verification information does not match the backup data associated with the third party account information.

(e) Providing a heartbeat information input prompt when the preset verification code associated with the third party account information is heartbeat verification, determine that the verification information matches the backup data associated with the third party account information when the heartbeat information received is the same as the heartbeat information corresponding to the third party account information, otherwise, determine that the verification information does not match the backup data associated with the third party account information.

(f) Providing a facial features information input prompt when the preset verification code associated with the third party account information is facial features verification, determine that the verification information matches the backup data associated with the third party account information when the face information received is the same as the face information corresponding to the third party account information, otherwise, determine that the verification information does not match the backup data associated with the third party account information.

When the preset verification code is biometric verification, the specific processes of the aforementioned methods (b)~(f) are based on the similar principles as those of method (a).

The text information verification may include one or more of: password card verification, digital certificate verification, signature information verification, preset question verification and preset trajectory verification. The "determining whether the verification information matches the backup data associated with the third party account information when the preset verification mode associated with the third party account information is text information verification" may further include but is not limited to the following methods:

(i) Provide password card enquiry information when the preset verification mode associated with the third party account information is password card verification, determine that the verification information matches the backup data associated with the third party account information when the verification information received being the same as the verification information corresponding to the password card enquiry information, otherwise, determine that the verification information does not match the backup data associated with the third party account information.

Specifically, the service provider's server may provide password card enquiry information and a verification information input area on the login interface according to password enquiry rules for a password card so that the user may be enabled to input verification information in the verification information input area. The service provider's server may receive the verification information inputted by the user through the terminal, and the service provider's server may compare to see whether the verification information received is the same as the verification information corresponding to the password card enquiry information on the service provider's server. If the verification information received is the same as the verification information corresponding to the password card enquiry information, it is determined that verification of the terminal is successful; otherwise, it is determined that verification of the terminal is not successful.

For example, the current password enquiry rules may be in the form of a bivariate table. If the login information does not match the reference login information, the service provider's server may acquire the password enquiry rules corresponding to the third party account information, provides password card enquiry information as a1b1. The verification information corresponding to a1 may be 336, and the verification information corresponding to b1 may be 123. The service provider's server may send password card enquiry information to the electronic mailbox associated with the third party account information as a1b1, at which time if the verification information inputted by the user is 336123, the service provider's server may be made aware through comparison that the verification information being the same as the verification information corresponding to the password card enquiry information, so that it may be determined that the verification of the terminal is successful.

It may be noted that when the preset verification mode associated with the third party account information is password card verification, the service provider's server may also send password card enquiry information and password card input link to the mobile phone number or electronic mailbox associated with the third party account information to guide the user to input verification information.

(ii) Acquire a digital certificate saved on the terminal when the preset verification mode associated with the third party account information is digital certificate verification, determine that the verification information matches the backup data associated with the third party account information when verification of the legitimacy of the digital certificate acquired is successful, otherwise, determine that the verification of the legitimacy of the digital certificate acquired is not successful.

When the terminal is installed with certain application, a digital certificate may be issued for the terminal by the application operator or network, and whether the terminal is a terminal frequently using the third party account information for login may be determined by verifying the digital certificated of the terminal currently requesting login. If the cipher key in the digital certificate saved on the terminal matches the cipher key corresponding to the third party account information saved on the service provider's server, it is deemed that the terminal currently requesting login is really the terminal frequently using the third party account information for login and the digital certificate is legitimate.

(iii) Acquire signature information saved on the terminal when the preset verification mode associated with the third party account information is signature information verification, determine that the verification information matches the backup data associated with the third party account information when verification of the legitimacy of the signature information acquired is successful, otherwise, determine that the verification of the legitimacy of the signature information acquired is not successful.

The signature information verification is similar to the digital certification verification, and signature information may also be issued for the terminal by the application operator or network. The difference is that the digital certificate may be issued by the application operator or the holder of the third party account information, and a third party other than the application operator according to the third party account information and application information, while the signature information may be issued by the application operator according to the third party account information and application information.

(iv) Provide a preset question associated with the third party account information when the preset verification mode associated with the third party account information is preset question verification, determine that the verification information matches the backup data associated with the third party account information when the answer received is the same as the answer to the preset question, otherwise, determine that the answer received is not the same as the answer to the preset question.

For example, the preset question associated with the third party account information may be "What is your favorite friend's name?" and the answer to the preset question may be "Li San". If the verification information received by the service provider's server is "Wang Wu", it can be known through comparison that the answer received is not the same as the answer to the preset question and it is determined that the verification information does not match the backup data associated with the third party account information.

(v) Provide a trajectory input prompt when the preset verification mode associated with the third party account information is preset trajectory verification, determine that the verification information matches the backup data associated with the third party account information when the trajectory information received is the same as the trajectory information corresponding to the third party account information, otherwise, determine that the verification information does not match the backup data associated with the third party account information when the trajectory information received is not the same as the trajectory information corresponding to the third party account information.

Wherein, the shape of the preset trajectory may be a pentagon, a triangle, a polygon or any other shape, and the shape of the preset trajectory is not specifically defined in this embodiment of the present disclosure.

For example, 9 position points marked 1, 2, 3, 4, 5, 6, 7, 8 and 9 respectively may be provided on the terminal display screen, and the trajectory information corresponding to the third party account information is a closed loop passing through 26842. If the trajectory information received by the service provider's server is 26842, it may be known through comparison that the trajectory information received is the same as the trajectory information corresponding to the third party account information and it is determined that the verification information matches the backup data associated with the third party account information.

It may be noted that Step 205 may adopt any of the aforementioned methods or any combination of the at least two of any of the aforementioned methods for verification of the terminal. How the methods are combined is not specifically defined in this embodiment of the present disclosure.

Step 205 is a process for verification of the login of the third party account information at the current login time through a preset verification mode associated with the third party account information, and when verification of the third party account information is successful but the login information does not match the reference login information, the mobile phone number, electronic mailbox, password card and instant messaging application account associated with the third party account information are used for verification, thereby enhancing the security of third party account login.

It may be noted that Step 205 described above may illustrate an example where the correspondence saved on the service provider's server may be the correspondence between the third party account information and the preset verification mode. In reality the correspondence saved on the service provider's server may be the correspondence between open account information and the preset verification mode. Hence based on the correspondence between the third party account information and the open account information, corresponding open account information may also be indirectly acquired according to the third party account information, and the preset verification mode corresponding to the open account information (i.e. the preset verification mode corresponding to the third party account information) may in turn be acquired according to the acquired open account information and the saved correspondence, for which the manner is not specifically defined in this embodiment of the present disclosure.

Step 206: reject login when verification is not successful.

Step 206 may include two situations as follows: (1) when verification of the third party account information is not successful, the service provider's server determines that the person currently logging in with the third party account information has not obtained authorization to log in with the third party account information and rejects the login; (2) after verification of the third party account information is successful, if the third party account information of the current third party account has been stolen by a hacker or an account stealer, the hacker may use the third party account information to pass the verification of the third party account information by the service provider's server in Steps 201 and 202. However, since the hacker does not have the login information of the owner of the third party account, the hacker may not pass the additional verification in Step 203.

Furthermore, since the hacker does not have response equipment of the mobile phone number associated with the third party account information, the third party account information of electronic mailbox, electronic password card enquiry rules, the third party account information of instant messaging application and other information, the hacker may not pass the additional verification in Step 205, and the service provider's server may deem the login unsafe and therefore reject the login.

It must be noted that in this embodiment of the present disclosure the method for service login may be used to protect third party account login, and in other embodiments of the present disclosure, verification of login information and the methods for verification of login using preset verification modes associated with the third party account information may also be employed to protect the account login system of the service and other application scenarios such as cash transaction, call record enquiry, wage access rights, etc.

In addition, this embodiment of the present disclosure may be described only as an example where verification of the current login is performed by the service provider's server according to the login information. In an actual scenario the process of verification according to login information may be performed at the user's terminal, i.e. when the terminal receives a login request, it may acquire the reference login information from the service provider's server and performs verification of the current login according to the acquired reference login information and the current login information of the terminal. When verification of the login information is not successful, the service provider's server is informed to continue verification according to the preset verification mode associated with the third party account information.

The method provided by the present disclosure enhances the verification of login information by judging whether the login information matches the reference login information to verify the login information when verification of account information is successful, so as to determine whether the login this time is consistent with the user's previous login habit (e.g. whether the same equipment is used for login, etc). By delivering service for the terminal according to the third party account information when the login information matches the reference login information so that the service provider's server may further verify the login information when the third party account is stolen, thereby enhancing the security of third party account login. Further, when verification of the third party account information is successful but the login information does not match the reference login information, the mobile phone number, electronic mailbox, password card and instant messaging application account associated with the third party account information may be used for the verification, thereby enhancing the security of third party account login.

Figure 4:
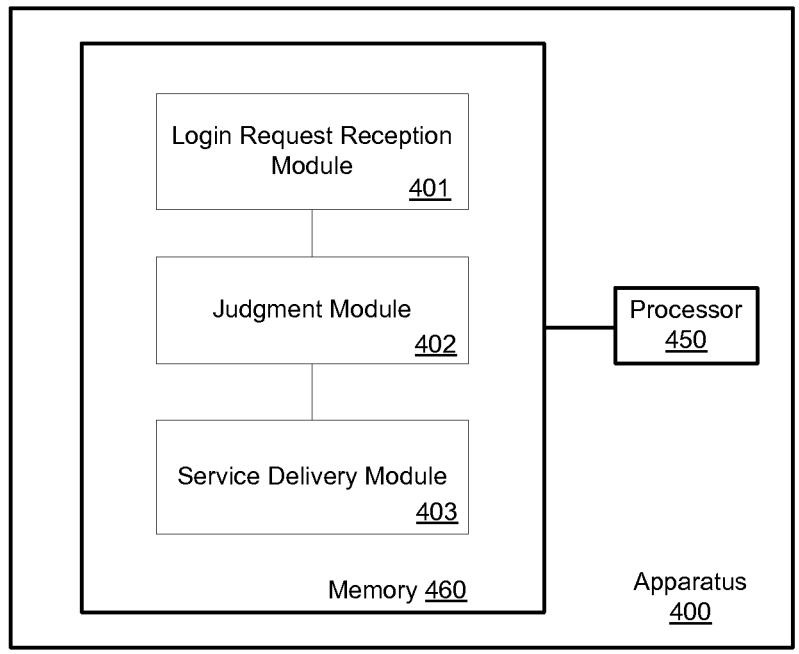
FIG. 4 is an exemplary schematic diagram of an apparatus for service login, according to an embodiment of the disclosure.

FIG. 4 is an exemplary schematic diagram of an apparatus (400) for service login, according to an embodiment of the disclosure. Referring to FIG. 4, the apparatus (400) may include at least a processor (450) operating in conjunction with at least a memory (460) which stores instruction codes operable as plurality of modules, wherein the plurality of modules may include at least: a login request reception module (401), a judgment module (402) and a service delivery module (403).

The login request reception module (401) may receive login request from a user, wherein the login request may inlude at least both terminal's login information input by the user and third party account information pertaining to the user. The judgment module (402), which after successful verification on the third party account information, may judge whether the terminal's login information input by the user matches to reference login information, wherein the reference login information may include specific information of the user to further identify user's identity. The service delivery module (403) which if the terminal's login information matches to at least a portion of the reference login information, delivers service to the terminal according to the third party account information.

Alternatively, the judgment module (402) may include: an acquisition unit which acquires the reference login information which corresponds to the third party account information; and a determination unit which determines that when the terminal's login information matches to at least a portion of the reference login information, confirming by the service provider that the login request is successful; otherwise, confirming by the service provider that the login request is unsuccessful.

The terminal's login information may include user's login time. Alternatively, the acquisition unit may acquires a designated user's login time period corresponding to the third party account information, wherein a user's login statistical value of the third party account information within the acquired user's designated login time period being greater than a first preset threshold. The determination unit may determine that when the user's login time is within the user's designated login time period, confirming that the user's login information matches the reference login information; otherwise, confirming that the login information does not match the reference login information.

Alternatively, the acquisition unit may acquire third party account information corresponding to the application identification code. The determination unit may determine that when the third party account information from the log in request being the same as the third party account information corresponding to the application identification code, confirming that the terminal's login information matches the reference login information; otherwise, confirming that the terminal's login information does not match the reference login information code.

Alternatively, the login statistical value corresponding to the login information in the reference login information may be greater than a second preset threshold.

Figure 5:
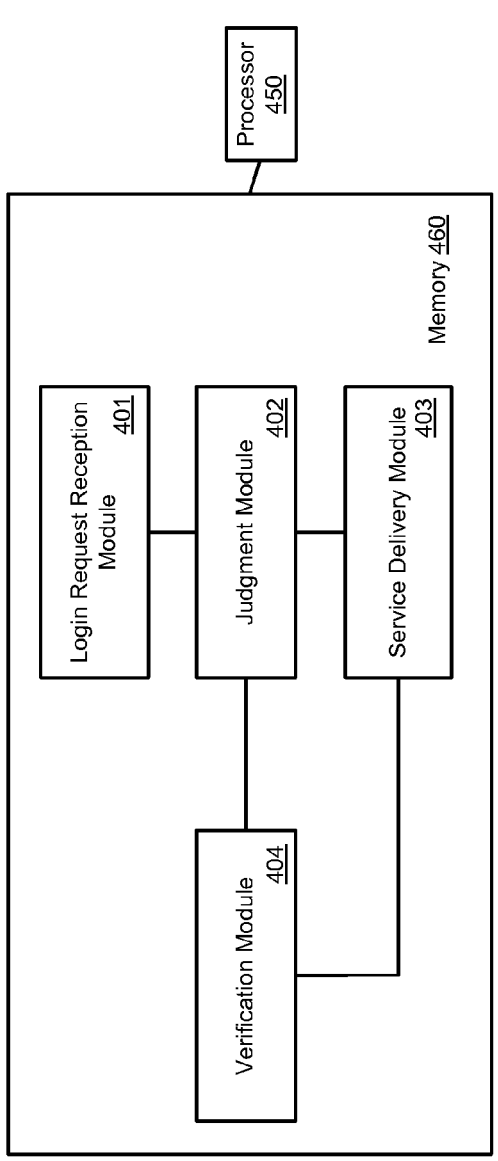
FIG. 5 is an exemplary schematic diagram of an apparatus for service login, according to another embodiment of the disclosure.

Alternatively, FIG. 5 is an exemplary schematic diagram of an apparatus (400) for service login, according to another embodiment of the disclosure. The Apparatus (500) in FIG. 5 is similar to the Apparatus (400) shown in FIG. 4, except with further inclusion of a verification module (404). The verification module (404) may be connected to the judgment module (402), and the verification module (404) may be connected to the service delivery module (403). The verification module 404, which if the terminal's login information does not match the reference login information, verifies the terminal according to a preset verification mode associated with the third party account information. The service delivery module (403) which when the verification is successful, delivers the service to the terminal according to the third party account information.

Alternatively, the verification module (404) may send a designated verification code to a mobile phone number associated with the third party account information when short message verification is the preset verification mode, wherein the designated verification code is to be entered as an additional input to the terminal; and confirms that the verification of the terminal is successful when the designated verification code received from the terminal as the additional input is the same as the sent designated verification code corresponding to the third party account information, otherwise, the verification of the terminal is not successful.

Alternatively, the verification module (404) may send a verification link to an electronic mailbox (e-mail) associated with the third party account information when e-mail verification is the preset verification mode, wherein the verification link is to be visited on the terminal; and confirms that verification of the terminal is successful when a network address corresponding to the verification link has been visited on the terminal within an interval of a first preset duration, otherwise, the verification of the terminal is not successful.

Alternatively, the verification module (404) may send a designated verification code to an instant messaging application account associated with the third party account information when instant messaging application verification is the preset verification mode, wherein the designated verification code is to be entered as an additional input to the terminal; and confirms that verification of the terminal is successful when the designated verification code received from the terminal as the additional input is the same as the sent designated verification code corresponding to the third party account information, otherwise, the verification of the terminal is not successful.

Alternatively, the verification module (404) may provide a backup data verification prompt associated with the third party account information when backup data verification is the preset verification mode, wherein the prompted backup data is to be entered as an additional input to the terminal; and confirms that verification of the terminal is successful when the backup data received from the terminal as the additional input matches the prompted backup data corresponding to the third party account information, otherwise, the verification of the terminal is not successful.

Alternatively, the verification module (404) may provide a biometric data input prompt associated with the third party account information when biometric data verification is the preset verification mode, wherein the biometric data is to be entered as an additional input to the terminal; and confirms that the backup data associated with the third party account information verification of the terminal is successful when the biometric data received from the terminal as the additional input matches the biometric data corresponding to the third party account information, otherwise, the verification of the terminal is not successful; or the verification module (404) may provide a text information input prompt associated with the third party account information when text information verification is the preset verification mode, wherein the text information is to be entered as an additional input to the terminal; and confirm that the backup data associated with the third party account information verification of the terminal is successful when the received text information matches the backup data associated with the third party account information, otherwise, the verification of the terminal is not successful.

Alternatively, the biometric verification may include one or more of: fingerprint information verification, voice verification, semantic verification, iris verification, heartbeat verification and face verification.

Alternatively, the text information verification may include one or more of: password card verification, digital certificate verification, signature information verification, preset question verification and preset trajectory verification.

Alternatively, the login request reception module (401) may omit further login request after a number of consecutively received login requests have failed verifications and the number has exceeded a third preset threshold.

Alternatively, the login request reception module (401) may omit a designated login request if a number of times the designated login request has received within a second preset duration has exceeded a fourth preset threshold, wherein the designated login request carries the application identification code, and wherein the third party account information carried by each designated login request being different.

Alternatively, the reference login information may include one or more of: terminal identifier, terminal equipment serial number, application identification code, terminal IP address, terminal geographical position information and terminal login time.

Figure 6:
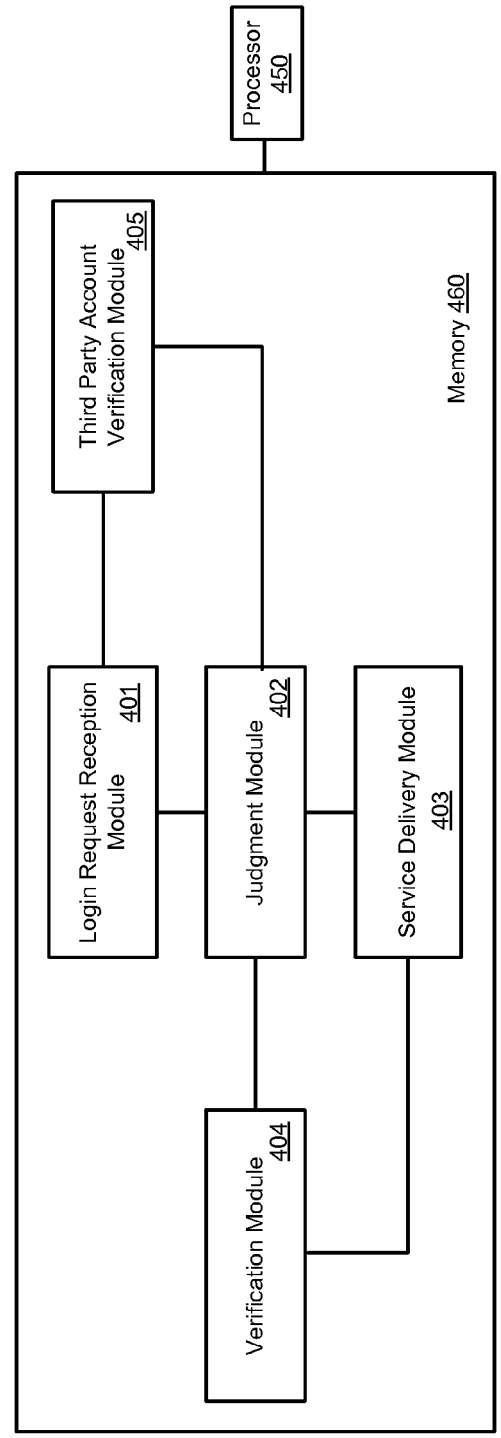
FIG. 6 is an exemplary schematic diagram of an apparatus for service login, according to another embodiment of the disclosure.

Alternatively, FIG. 6 is an exemplary schematic diagram of an apparatus for service login, according to another embodiment of the disclosure. The apparatus of FIG. 6 is similar to that shown in FIG. 5, except with further inclusion of a third party account verification module (405), wherein the third party account verification module 405 is connected to the login request reception module (401), and the third party account verification module (405) is connected to the judgment module (402).

The third party account verification module (405) may determine whether an open account information corresponding to the third party account information has already been saved on a server according to the third party account information when a login request is received; wherein the verification of the third party account information is successful when it is determined that the open account information corresponding to the third party account information has already been saved on the server.

All the foregoing technical schemes may be combined in any manner to form optional embodiments of the present disclosure.

It may be noted that the apparatus (400) for service login provided by the above embodiment and used for the method for service login is described only in connection with the division of various function modules, and in actual application the abovementioned functions may be assigned to different function modules according to the needs, i.e. the internal structure of the equipment may be divided into different function modules to complete all or part of the abovementioned functions. In addition, the apparatus (400) for service login provided by the foregoing embodiments and the embodiments of the method for service login have the same concept, and the implementation of the apparatus is as described in detail in the embodiments of the method for service login.

Figure 7:
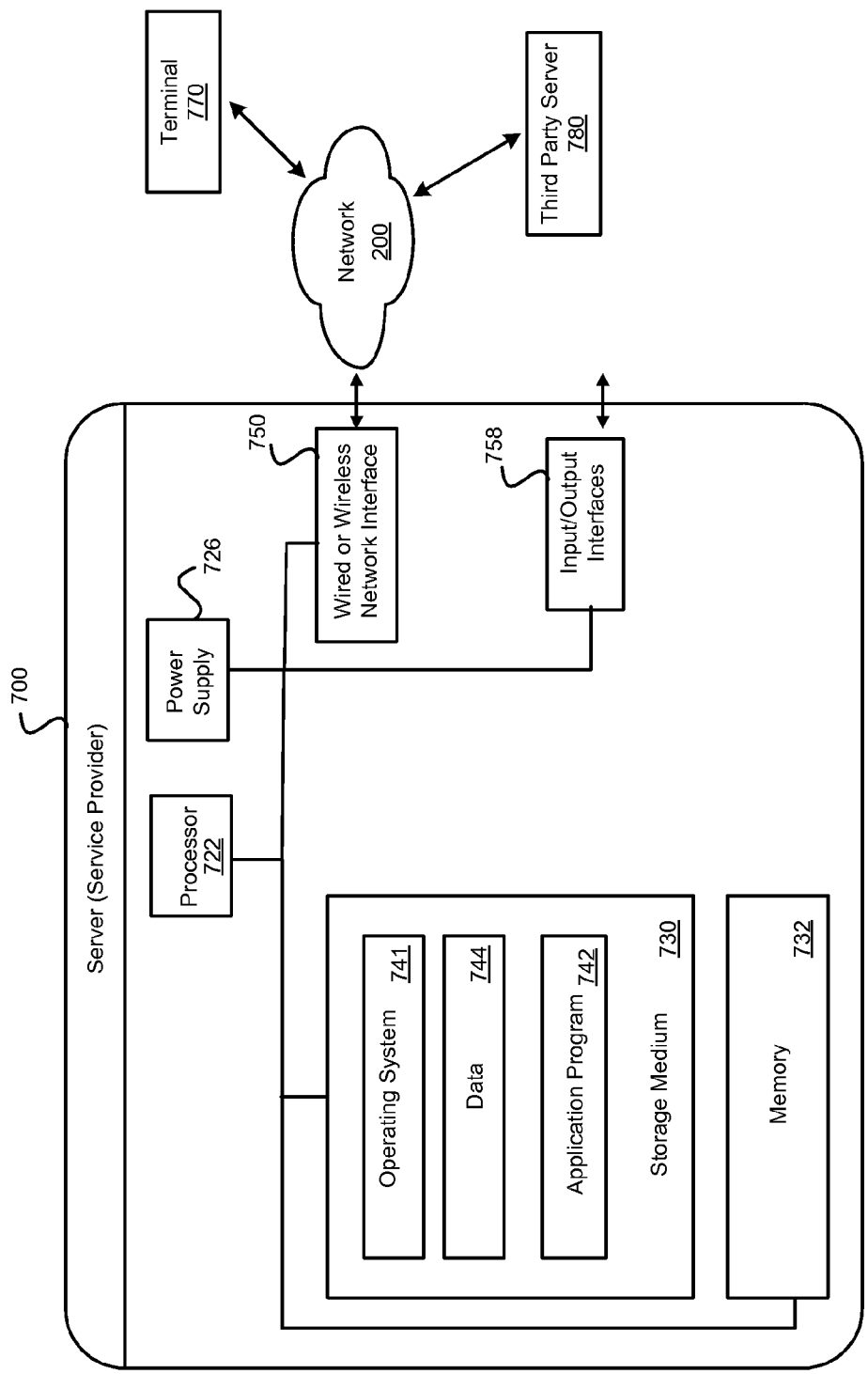
FIG. 7 is an exemplary schematic diagram of a server for service login, according to an embodiment of the disclosure.

FIG. 7 is an exemplary schematic diagram of a server for service login by a user's terminal (770) through a network (200), according to an embodiment of the disclosure. Referring to FIG. 7, which is a schematic diagram of a server (700) which an embodiment of the present disclosure relates. The service provider's server (700) may have great variance depending on configuration or functionality, and it may include one or more central processing units (CPUs) (722) and memories (732), one or more application programs (742) or storage media (730) for data (744) (e.g. one or more mass storage devices).

Wherein, the memory (732) and the storage medium (730) may store temporarily or permanently. The program stored on the storage medium (730) may include one or more modules (not shown) and each module may include operations of a series of commands stored on the service provider's server. Further, the CPU (722) may be configured to communicate with the storage medium (730) and to execute a series of commands stored in the storage medium (730) on the service provider's server (700). The service provider's server (700) may also include one or more power supplies (726), one or more wired or wireless network interfaces (750), one or more input/output interfaces (758), and/or one or more operating systems (741), e.g. Windows Server™, Mac OS X™, Unix™, Linux™, FreeBSD™, etc. The steps performed by the service provider's server in the embodiment as shown in FIG. 2 may be based on the service provider's server (700) as shown in FIG. 7.

It should be understood by those with ordinary skill in the art that all or some of the steps of the foregoing embodiments may be implemented by hardware, or software program codes stored on a non-transitory computer-readable storage medium with computer-executable commands stored within. For example, the disclosure may be implemented as an algorithm as codes stored in a program module or a system with multi-program-modules. The computer-readable storage medium may be, for example, nonvolatile memory such as compact disc, hard drive. ROM or flash memory. The computer-executable commands are used to enable a computer, server, a smart phone, a tablet or any similar computing device to render service login provided by a service provider.

The foregoing represents only some preferred embodiments of the present disclosure and their disclosure cannot be construed to limit the present disclosure in any way. Those of ordinary skill in the art will recognize that equivalent embodiments may be created via slight alterations and modifications using the technical content disclosed above without departing from the scope of the technical solution of the present disclosure, and such summary alterations, equivalent has changed and modifications of the foregoing embodiments are to be viewed as being within the scope of the technical solution of the present disclosure.

What is claimed is:

1. A method for service login to a service provider, comprising:
   receiving by the service provider, a login request from a user terminal, wherein the login request comprises at least:
      terminal's login information which is specific to the user terminal and is used by a user for login to the user terminal itself; and
      an input of user's third party account information which corresponds to an open account information acquired by the service provider for user's third party account information verification by the service provider prior to verifying the terminal login information of the user;
   after successful verification on the user's third party account information, determining by the service provider; whether the terminal's login information matches to reference login information, wherein the reference login information comprises specific information of the user to further identify user's identity; if the terminal's login information matches to at least a portion of the reference login information, delivering service to the terminal according to the successful verification of the third party account information;
   wherein the terminal's login information comprises an application identification code, and wherein the determining of whether the terminal's login information input matches the reference login information, comprises: acquiring the third party account information corresponding to the application identification code; and when the third party account information from the login request being the same as the third party account information corresponding to the application identification code, confirming that the terminal's login information matches the reference login information.

2. The method according to claim 1, wherein the determining of whether the terminal's login information input matches the reference login information, comprises:
   acquiring by the user terminal, the reference login information which corresponds to the third party account information, wherein:
   when the terminal's login information matches to at least a portion of the reference login information, confirming by the service provider that the login request is successful; otherwise, confirming by the service provider that the login request is unsuccessful.

3. The method according to claim 1, wherein the user terminal's login information comprises user's login time, and wherein the determining of whether the terminal's login information input matches the reference login information, comprises:
   acquiring a designated user's login time period corresponding to the third party account information, wherein a user's login statistical value of the third party account information within the acquired user's designated login time period being greater than a first preset threshold, wherein:
   when the user's login time is within the user's designated login time period, confirming that the user's login information matches the reference login information; otherwise, confirming that the login information does not match the reference login information.

4. The method according to claim 1, wherein,
   when the third party account information from the login request is not the same as the third party account information corresponding to the application identification code, confirming that the terminal's login information does not match the reference login information code.

5. The method according to claim 2, wherein a login statistical value corresponding to the terminal's login information in the reference login information being greater than a second preset threshold.

6. The method according to claim 1, further comprising:
   if the terminal's login information does not match the reference login information, verifying the user terminal according to a preset verification mode associated with the third party account information;
   when the verification is successful, delivering the service to the user terminal according to the third party account information.

7. The method according to claim 6, wherein the verifying of the terminal according to the preset verification mode associated with the third party account information, comprises:
   sending a designated verification code to a mobile phone number associated with the third party account information when short message verification is the preset verification mode, wherein the designated verification code is to be entered as an additional input to the user terminal;

confirming that the verification of the user terminal is successful when the designated verification code received from the user terminal as the additional input is the same as the sent designated verification code corresponding to the third party account information, otherwise, the verification of the user terminal is not successful.

8. The method according to claim 6, wherein the verifying of the user terminal according to the preset verification mode associated with the third party account information, comprises:

sending a verification link to an electronic mailbox (e-mail) associated with the third party account information when e-mail verification is the preset verification mode, wherein the verification link is to be visited on the user terminal;

confirming that verification of the user terminal is successful when a network address corresponding to the verification link has been visited on the user terminal within an interval of a first preset duration, otherwise, the verification of the user terminal is not successful.

9. The method according to claim 6, wherein the verifying of the user terminal according to the preset verification mode associated with the third party account information, comprising:

sending a designated verification code to an instant messaging application account associated with the third party account information when instant messaging application verification is the preset verification mode, wherein the designated verification code is to be entered as an additional input to the user terminal;

confirming that verification of the user terminal is successful when the designated verification code received from the user terminal as the additional input is the same as the sent designated verification code corresponding to the third party account information, otherwise, the verification of the user terminal is not successful.

10. The method according to claim 6, wherein the verifying of the terminal according to the preset verification mode associated with the third party account information, comprises:

providing a backup data verification prompt associated with the third party account information when backup data verification is the preset verification mode, wherein the prompted backup data is to be entered as an additional input to the user terminal;

confirming that verification of the user terminal is successful when the backup data received from the user terminal as the additional input matches the prompted backup data corresponding to the third party account information, otherwise, the verification of the user terminal is not successful.

11. The method according to claim 10, wherein the backup data verification comprises one or more of: biometric verification and text information verification, and the providing of the backup data verification prompt associated with the third party account information when backup data verification is the preset verification mode, comprises:

providing a biometric data input prompt associated with the third party account information when biometric data verification is the preset verification mode, wherein the biometric data is to be entered as an additional input to the user terminal;

confirming that the backup data associated with the third party account information verification of the user terminal is successful when the biometric data received from the user terminal as the additional input matches the biometric data corresponding to the third party account information, otherwise, the verification of the user terminal is not successful; or providing a text information input prompt associated with the third party account information when text information verification is the preset verification mode, wherein the text information is to be entered as an additional input to the user terminal;

confirming that the backup data associated with the third party account information verification of the terminal is successful when the received text information matches the backup data associated with the third party account information, otherwise, the verification of the terminal is not successful.

12. The method according to claim 11, wherein the biometric data verification comprises one or more of: fingerprint information verification, voice verification, semantic verification, iris verification, heartbeat verification and facial features verification.

13. The method according to claim 11, wherein the text information verification comprises one or more of: password card verification, digital certificate verification, signature information verification, preset question verification and preset trajectory verification.

14. The method according to claim 1, wherein after performing the verification according to the third party account information, the method further comprises:

omitting further login request after a number of consecutively received login requests have failed verifications and the number has exceeded a third preset threshold.

15. The method according to claim 1, wherein the terminal's login information comprises application identification code, and the method further comprises:

omitting a designated login request if a number of times the designated login request has received within a second preset duration has exceeded a fourth preset threshold, wherein the designated login request carries the application identification code, and wherein the third party account information carried by each designated login request being different.

16. The method according to claim 1, wherein the reference login information comprises one or more of: terminal identifier, terminal equipment serial number, application identification code, terminal IP address, terminal geographical position information and terminal login time.

17. The method as defined in claim 1, further comprising:

determining whether an open account information corresponding to the third party account information has already been saved on a server according to the third party account information when a login request is received;

the verification of the third party account information is successful when it is determined that the open account information corresponding to the third party account information has already been saved on the service provider's server.

18. An apparatus in a service provider server for service login, comprising at least a processor operating in conjunction with at least a memory which stores instruction codes operable by the processor to configure the apparatus to:

receive a login request from a user, wherein the login request comprises at least terminal's login information which is specific to a terminal which is used by the user for login to the terminal itself, and an input of user's third party account information which corresponds to an open account information acquired by the service provider server for user's third party account information verification by the service provider server prior to verifying the terminal login information of the user;

after successful verification by the service provider server on the user's third party account login information, judge whether the terminal's login information matches to reference login information, wherein the reference login information comprises specific information of the user to further identify user's identity;

if the terminal's login information matches to at least a portion of the reference login information; deliver service to the user terminal according to the successful verification of the third party account information;

wherein the terminal's login information comprises an application identification code, and wherein the determining of whether the terminal's login information input matches the reference login information, comprises: acquiring the third party account information corresponding to the application identification code; and when the third party account information from the login request being the same as the third party account information corresponding to the application identification code, confirming that the terminal's login information matches the reference on information.

19. The apparatus according to claim 18, wherein the apparatus is configured to:
acquire the reference login information which corresponds to the third party account information;
determine that when the terminal's login information matches to at least a portion of the reference login information, confirming by the service provider that the login request is successful; otherwise, confirming by the service provider that the login request is unsuccessful.

20. The apparatus according to claim 18, wherein the terminal's login information comprises user's login time, wherein the apparatus is configured to:
acquire a designated user's login time period corresponding to the third party account information, wherein a user's login statistical value of the third party account information within the acquired user's designated login time period being greater than a first preset threshold:
determine that when the user's login time is within the user's designated login time period, confirm that the user's login information matches the reference login information; otherwise, confirm that the login information does not match the reference login information.

* * * * *